United States Patent [19]
Lehovec

[11] 3,824,400
[45] July 16, 1974

[54] INDUCED CHARGE TRANSFER DEVICES

[76] Inventor: Kurt Lehovec, 11 Woodlawn Dr., Williamstown, Mass. 01267

[22] Filed: Sept. 27, 1972

[21] Appl. No.: 292,694

Related U.S. Application Data

[63] Continuation-in-part of Ser. No. 861,021, Sept. 25, 1969, abandoned, which is a continuation-in-part of Ser. No. 703,958, Feb. 8, 1968, Pat. No. 3,473,032.

[52] U.S. Cl............ 250/552, 313/108 D, 317/235 N
[51] Int. Cl................................................ G02f 1/28
[58] Field of Search................. 250/217 SS, 211 J; 317/235 N, 235 A, 235 B, 235 AG, 235 AH; 313/108 D; 307/312, 319; 315/94, 169

[56] References Cited
UNITED STATES PATENTS

| | | | |
|---|---|---|---|
| 3,366,819 | 1/1968 | Crowder | 250/217 SS |
| 3,413,506 | 11/1968 | Cuthbert | 313/108 D |
| 3,424,934 | 1/1969 | Berglund | 313/108 D |
| 3,473,032 | 10/1969 | Lehovec | 250/217 SS |
| 3,492,548 | 1/1970 | Goodman | 313/108 D |
| 3,493,891 | 2/1970 | Fern | 313/108 D |

*Primary Examiner*—James W. Lawrence
*Assistant Examiner*—D. C. Nelms

[57] ABSTRACT

Electric devices which comprise an induced mobile charge in a semiconducting layer facing a mobile charge of opposite polarity across a semi-insulating layer. The positions of these charges are shifted simultaneously. In one embodiment of the invention said charges are induced on opposite surfaces of a thin semiconducting layer through insulators by means of applied potentials and said semi-insulating layer is a depletion space charge layer in the semiconductor between said opposite surfaces, the induced charges exchanging positions by reversal of the applied potentials. In another embodiment one of said mobile charges is a Gunn domain which induces the mobile charge of opposite polarity through a semi-insulating film of the Gunn device material, said charges shifting parallel to each other along said semi-insulating film.

4 Claims, 6 Drawing Figures

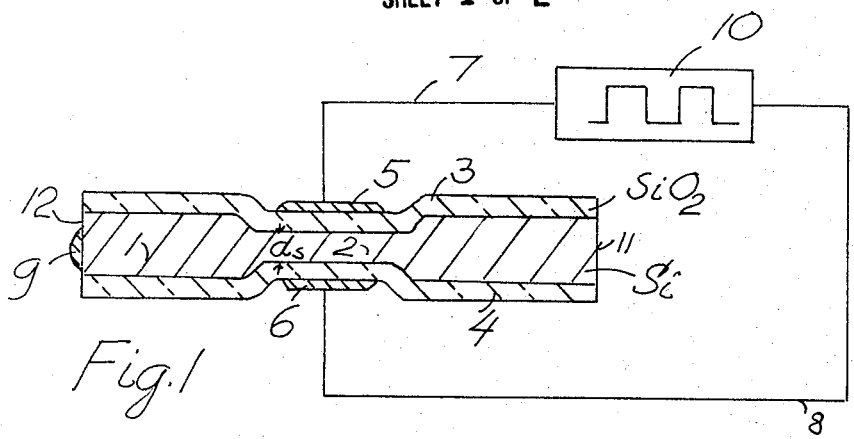
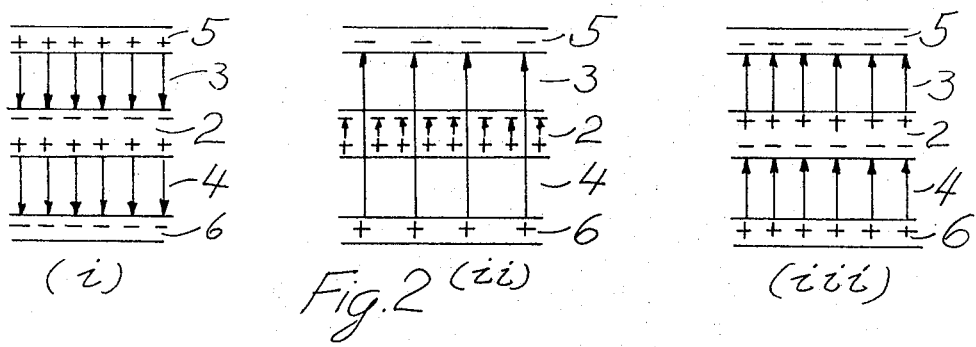
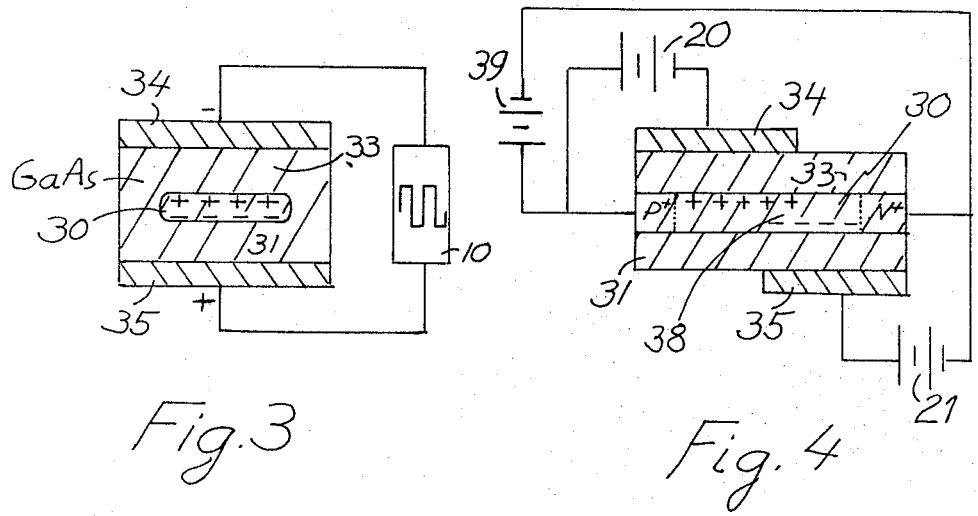

INDUCED CHARGE TRANSFER DEVICES

CROSS REFERENCE TO RELATED APPLICATION

This application is a continuation-in-part of U.S. Patent application Ser. No. 861,021, filed Sept. 25, 1969, now abandoned, which in turn is a continuation-in-part of U.S. Patent application Ser. No. 703,958, filed Feb. 8, 1968 now U.S. Pat. No. 3,473,032.

BACKGROUND OF THE INVENTION

Electronic semiconducting devices utilize the motion of electric charge carriers, electrons and holes, under applied electric fields. This motion frequently involves the concepts of generation of carriers, and their anihilation, or removal. Carriers can be supplied by or removed from electrodes to the semiconductor, or else supplied by generation of electron-hole pairs and removed by recombination. This recombination can lead to light emission. While electron-hole pair generation and recombination in the bulk of a semiconductor is well understood and is being utilised for such devices as light emitting p-n junction diodes, little use has been made so far of surface generation of electron-hole pairs and their recombination at surfaces. C. N. Berglund in U.S. Pat. No. 3,424,934, R. E. Fern et al, in U.S. Pat. No. 3,493,891, B. L. Crowder et al in U.S. Pat. No. 3,366,819, and A. M. Goodman in U.S. Pat. No. 3,492,548 teach electro-luminescent devices involving high resistivity layers at or near a semiconducting surface, generation of minority carriers at or near these layers, and subsequent recombination with bulk majority carriers. However, these prior art devices have the disadvantage that response time to a change of the applied voltage and recombination is generally associated with motion of injected minority carriers into the bulk of the semiconductor and requires supply of majority carriers from the bulk of the semiconductor.

In the parent application Ser. No. 703,958 filed Feb. 8, 1968, I have taught a new class of devices based on surface induced electron and hole-conducting regions. The present invention teaches inducing both carrier types by an applied bias voltage at two surface sections of the semiconductor which are separated by a region void of mobile carriers either by virtue of depletion of these carriers, or else by virtue of its dopant content or lack of it. Change of the bias voltage shifts these induced carriers between said surface sections and causes recombination without involving supply of bulk majority carriers or migration of carriers through the electrically neutral bulk of the semiconductor.

This invention deals with a variety of electro-optical circuit devices all having a surface induced p-n junction. These devices are of the general type described in my application Ser. No. 703,958, but contain distinct inventive features which facilitate device preparation or enchance device usefulness.

In my application Ser. No. 703,958, I have described a device which utilizes the junction between an induced p-layer and an induced n-layer for photoelectric purposes, i.e., as a light sensitive circuit element or else as a light emitting circuit element. The p- and n-layers were induced on the surface of a semiconductor capable of electron and hole conductions and having a very high bulk resistivity, so that current paths shunting the surface induced conductivity regions are eliminated. Moreover, the semiconducting material must have the property that electric field lines impinging on its surface terminate predominantly in free electrons or holes, rather than in the immobile surface charges associated with so-called surface states. Among the semiconducting materials whose technology has been developed most thoroughly are silicon and gallium arsenide. It is known how to prepare silicon-silicon oxide structures reasonably free of surface states. However, the bulk resistivity of silicon at room temperature is rather low, even in the purest samples and in samples of presently best possible compensation of impurities. Gallium arsenide, on the other hand, is known to occur in a semiinsulating variety, by incorporation of suitable ions, such as chromium, but surface state properties are not fully satisfactory.

Accordingly, it is one objective of the present invention to describe induced p- and n-junction structures which utilize silicon or gallium arsenide at room temperature.

Another objective of this invention concerns geometrical arrangements of photoelectric induced p-n junction devices of unusual and advantageous properties.

Yet another object of this invention concerns a photoelectric induced p-n junction device whose junction is shifted by means of a travelling Gunn domain.

SUMMARY OF THE INVENTION

In the parent application, it has been mentioned already that bulk conductance can be repressed, respectively avoided by using sufficiently thin semiconducting films. Accordingly, we select a film thickness which is less than the extention of the depletion layer underlying a surface induced inversion layer. Current path is then restricted to enter or leave the surface inversion layer at its lateral boundaries or rims, rather than flowing through the underlying substrate. In other words, silicon becomes a semi-insulator by depletion of its carriers.

Gallium arsenide surface induced conducting regions are generated at the surface of a semiconducting gallium arsenide layer using a semi-insulating gallium arsenide layer as spacer to the inducing electrode. Surface states are then avoided by the continuity of the host lattice. If the semi-insulating gallium arsenide layer is sandwiched between a conducting substrate and a conducting thin epitaxial gallium arsenide layer, a Gunn domain travelling along the substrate is accompanied by an induced p-n junction in the epitaxial layer, thus providing a continuous motion of the induced p-n junction.

One advantageous geometrical arrangement of a photoelectric induced p-n structure device according to this invention utilizes a thin web semiconducting layer with provisions to induce p- and n-regions at opposing surfaces of the thin layer. Reversal of the inducing field polarities causes the electrons and holes to travel through the thin layer to the opposite surface from their previous positions, causing a burst of recombination radiation as they pass each other. With suitable choice of dimensions, a sufficiently high field can be generated in the web regions that reversal of polarity of the applied voltage creates electron and hole pairs by tunnel or avalanche effects, thus replenishing the carriers lost by recombination. This structure, using a conducting gallium arsenide layer sandwiched between two semi-insulating gallium arsenide layers, is suitable for a pulse laser operation. No contacts to the induced p- and n-regions are required.

BRIEF DESCRIPTION OF DRAWINGS

FIG. 1 shows a cross section of an induced junction device according to this invention.

FIG. 2 indicates the electric field distribution in the narrow web section of the device of FIG. 1 at three states of applied potential.

FIG. 3 shows another induced junction device according to this invention using semi-insulating and semiconducting layers of the same host material.

FIG. 4 shows a modification of device of FIG. 3.

DESCRIPTION OF THE PREFERRED EMBODIMENT

Figure 5:
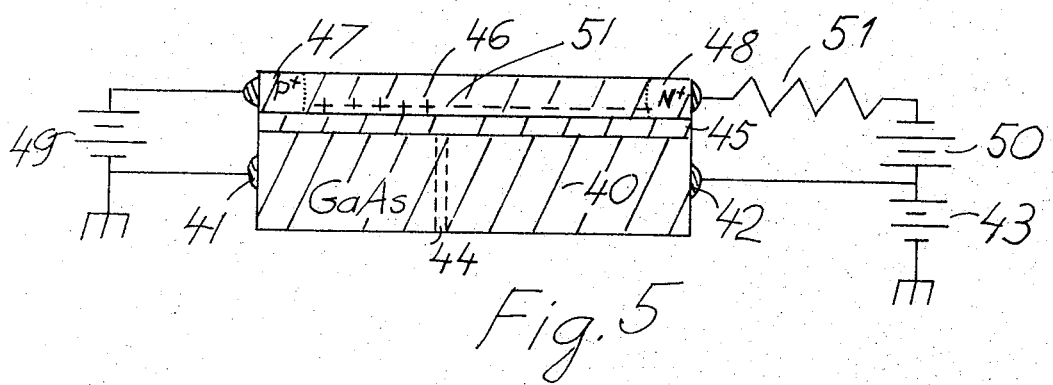
FIG. 5 shows an induced p-n junction device according to this invention utilizing a travelling Gunn domain for generation of motion of induced p-n junction.

FIG. 1 shows in cross section a semiconducting wafer 1 having a narrow web region 2, of width $d_s$, transparent insulating layers 3 and 4 on opposite sides of the narrow web region 2 and inducing electrodes 5 and 6 on the outer surfaces of the portions of the insulating layers 3 and 4 which adjoin the narrow web region 2. Contact leads 7 and 8 to the inducing electrodes are shown also. 9 is a base contact to the semiconducting body.

In one application of the structure of FIG. 1, the contact 9 is left floating and a potential is applied between the electrodes 5 and 6. This potential induces a p-type surface conduction region on one side of the web, and an n-type conduction region on the opposite side of the web, with an induced p-n junction extending across the web.

If the potential applied between 7 and 8 is now reversed, the induced holes and electrons are repelled from their respective surfaces and pushed across the web to the opposite surfaces causing a forward current pulse across the induced p-n junction. While passing each other, some of the holes and electrons recombine, thus stimulating light emission.

The recombination can be of the direct type or via suitable recombination centers included in the semiconductor 1. By connecting 7 and 8 to a flip-flop power source 10, there will be a light burst upon each firing of the flip-flop. If electrons and holes lost by recombination are regenerated during each cycle, the light output averages over a second increases in proportion to the frequency of the flip-flop. Thus, the light output can be conveniently raised by means of the frequency of the flip-flop which is of value for use of the structure of FIG. 1 as an element of a light panel indicator or television screen.

In such a light panel, each light source of the type shown in FIG. 1 is integrated with its own flip-flop circuit containing a frequency tuning element which is set by the television signal about each one-thirtieth second providing the frequency for the desired light output. The frequency tuning element can be a voltage sensitive capacitor, i.e., a varactor of sufficiently low leakage that an imposed voltage signal remains for one-thirtieth second until the scanning television signal returns.

If recombined electron hole pairs were not replenished the web would eventually become empty of carriers and the structure of FIG. 1 would then act as a multilayer capacitor, with the web contributing to the capacitance in accordance with its thickness and dielectric constant.

In the parent application, it has been mentioned that replenishment of electrons and holes can occur by several different means, including thermal generation, lateral transport from supplying contacts, tunnel and avalanche processes. The latter require high electric fields. It is an important aspect of my invention to dimension the web in such a manner that such high fields are generated in the web region upon the reversal of applied fields.

The pertinent quantitative considerations are as follows: The surface charge induced by the field $F_i$ in the insulators 3 and 4 is $\epsilon_i \epsilon_o F_i$ where $\epsilon_i$ is the dielectric constant of the insulator and $\epsilon_o = 8.84 \times 10^{-14}$ coul/V cm. $F_i$ is limited by the breakdown strength of the insulator which is typically several millions volt/cm. Surface charge densities of about $10^{-6}$ coul/cm$^2$ are thus achievable.

FIG. 2 depicts the field distribution indicated by flux lines F for the structure of FIG. 1 for three cases; namely, from left to right: (i) stationary state with upper electrode plus and lower electrode minus; (ii) immediately after reversing the applied potential; (iii) after stationary state has been reached, upper electrode now minus and lower electrode plus. Note that immediately after reversal of the polarity of the potential, i.e., in case (ii) the surface induced charges of case (i) generate a field in the web region which adds to the field due to the charges at the inducing electrodes. A more detailed calculation shows that the field in the web region immediately after reversal of applied voltage can be as large as $2\epsilon_i/\epsilon_s$ times the field $F_i$ in the insulators before reversal of voltage, i.e., the field in case (i), provided with width of the web, $d_s$, is very small compared to the width $d_i$ of the insulators 3 and 4. Here, $\epsilon_i$ is the dielectric constant of the insulators 3 and 4 and $\epsilon_s$ that of the semiconductor 1. On the other hand, if $d_s \gg d_i$, the field in the semiconductor in case (ii) is only $F_s \approx 4 F_i d_i/d_s$. However, a higher field strength may arise locally in the semiconductor by inhomogeneous field distribution due to space charges in the web region. For regeneration of electron-hole pairs by tunnel or avalanche effect, it is important to dimension insulators and web so that $F_i$ is below breakdown strength, yet $F_s$ is above field strength for tunnel or avalanche effects to occur.

Similar considerations as made above for reversal of the polarity of the applied voltage apply to other changes of applied voltage: e.g., a d. c. voltage to 7 and 8 with periodic brief shorts of the electrodes 5 and 6.

In the case of silicon-silicon dioxide combinations, one has $\epsilon_i/\epsilon_s \approx 1/3$. A web thickness of approximately 1 micron and an oxide thicknesses of approximately one-half micron can be readily achieved by the well-known jet etch technique used by the Philco Corporation for production of surface barrier transistors and by subsequent thermal or anodic oxidation. Transparent electrodes, either tin oxide or thin metal layers, are preferred to permit emission or radiation.

The narrow web thickness enables recombination radiation to escape from the entire web region without strong reabsorption by the host material.

An active impurity concentration of $N = 10^{15}$ cm$^{-3}$ or less of the silicon semiconductor 1 is readily achievable, and the ionic charge per cm$^2$ in the web, $Nqd_s$, where $q = 1.6 \times 10^{-19}$ coul, is then small compared to the induced surface charges of $10^{-6}$ coul/cm$^2$.

At high fields in the semiconductor immediately after potential reversal, the electrons and holes cross the web at saturation drift velocity of about $10^7$ cm/sec. Transit time is thus only $10^{-4}/10^7 = 10^{-11}$ sec. Accordingly, while the transferred charge is only $2 \times 10^{-6}$ coul/cm$^2$, the peak current density corresponding to this charge transfer, $2 \times 10^{-6}/10^{-11} = 2 \times 10^5$ amp/cm$^2$ is quite large. In practice, the speed of charge transfer is usually limited by the capability of supplying or withdrawing the charges to the electrodes through the external circuit.

The average current density of the device is $f$ times $2 \times 10^{-6}$ coul/cm$^2$ where $f$ is the frequency of polarity reversals. With regeneration by tunnel or avalanche processes, frequencies in the high megaherz range can be used.

FIG. 3 shows in cross section a structure comprising a semiconducting gallium arsenide layer 30 sandwiched between two semi-insulating gallium arsenide layers 31 and 33 which are provided with metal electrodes 34 and 35.

Semi-insulating gallium arsenide of resistivities in the high megohm cm range can be generated by incorporation of certain impurities having deep-lying trap levels and compensating the donor or acceptor type impurities which otherwise would cause semi-conduction, Examples for impurities creating semi-insulation in GaAs are hydrogen or chromium. These impurities can be incorporated during crystal growth, or subsequently by diffusion, or else by ion implantation from a gas discharge. For instance, H$^+$ ions accelerated by 100 kilovolts and impinging on GaAs or ZnTe are able to penetrate to a depth of about 1 micron.

The structure of FIG. 3 serves a similar purpose as that of FIG. 1, whereby the "narrow web semiconductor" 2 is now the layer 30, and the "insulating layers" 3 and 4 are the semi-insulating layers 31 and 33.

For each of the three gallium arsenide layers in FIG. 3, a time constant can be defined by multiplying its resistivity $\rho$ by the dielectric product $\epsilon\epsilon_o$. The dielectric product is about the same for all three layers. For the semi-insulating gallium arsenide variety, this time constant can be as high as $10^{-3}$ sec, while for the semiconducting variety the time constant is only in the $10^{-10}$ sec range or lower, dependent on its dopant. By switching the polarity of the potentials applied to the inducing electrodes at a rate in the megaherz range using the pulse generator 10 of FIG. 3, the semi-insulating layers 31 and 33 act as dielectrics rather than conductors, while the semiconducting layer 30 acts as a conductor rather than a dielectric. More important, the electrons and holes induced at the surfaces of the layer 30 cannot escape through the semi-insulating layers 31 and 33 if the field in these layers is kept below the range where avalanche breakdown occurs. Even if some injection into these layers takes place, field reversal returns most of the injected carriers before they can cross the semi-insulating layers 31 and 33, provided the field is reversed sufficiently rapidly.

Figure 6:
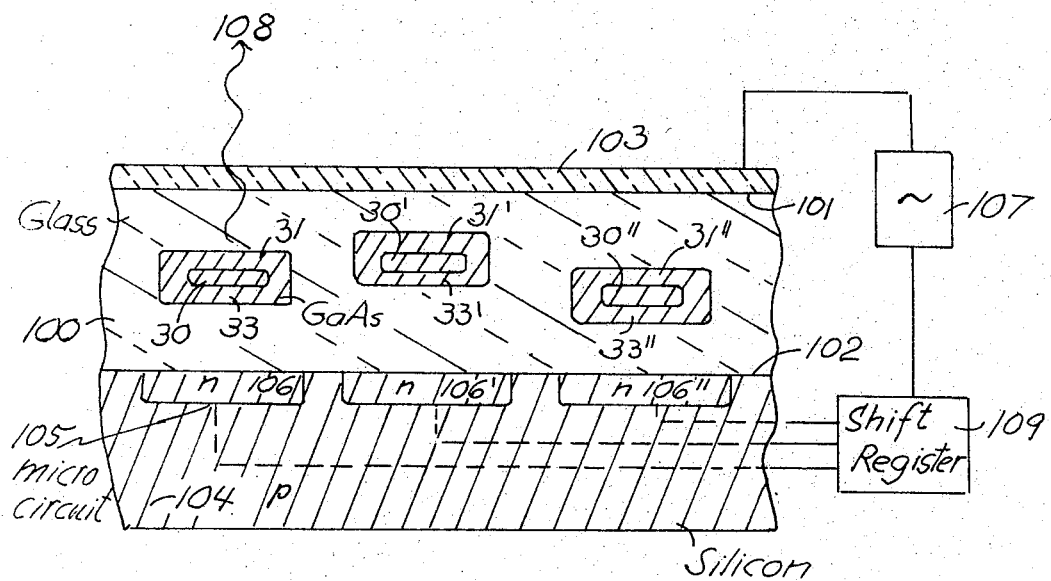
FIG. 6 illustrates an electroluminescent display panel according to this invention.

Useful extensions of the structure of FIG. 3 include the insertion of an additional dielectric between the electrodes 34, 35 and the semi-insulating layers 31, 33. In the preferred embodiment illustrated in FIG. 6 several thin slices 30, 30', 30'' of conductive gallium arsenide are prepared by cleaving in the (110) crystallographic plane and coated with semi-insulating gallium arsenide 31, 33, 31', 33', 31'', 33'' by hydrogen ion implantation. They are then imbedded in an insulating transparent glass 100 with major flat faces facing the flat boundaries 101, 102 of the glass. The face 101 is provided with a transparent stannous oxide electrode 103 for application of the a.c. electric voltage from source 107 inducing radiation output 108. The other electrode can be a silicon substrate 104 facing the other surface 102 of the glass and comprising microcircuit means 105 to stimulate light output 108 in selected positions such as 106 and/or time sequence. The microcircuit means 105 contains a set of n-regions 106, 106', 106'' in the p-type silicon substrate 104, with a shift register microcircuit, 109, not shown in detail, channeling the a.c. source voltage 107 in sequence to 106, 106', 106''.

The structure shown in FIG. 3 can be given boundaries which are parallel to each other and perpendicular to the layer 30 as to provide the appropriate condition for laser action. Preferred method is cleavage along a crystallographic plane using the same technique as employed widely for chemically doped GaAs p-n junction injection lasers. In this manner, the structure of FIG. 3 can be used as a laser. In the conventional injection laser configuration, the reflecting boundaries are perpendicular to the junction. I have found it advantageous to also use the electrodes 34 and 35 as reflecting boundaries and to choose the total thickness of the layers 30, 31 and 33 in relation to the wavelength of the emitted light, thereby selecting the mode of laser operation.

Light output of gallium arsenide devices is in the near infrared. For visible light output, ZnTe can be used and the semi-insulating variety is generated again by H$^+$ implantation.

FIG. 4 shows a modification of the structure of FIG. 3, which differs from FIG. 3 in that the inducing electrodes 34 and 35 are laterally displaced from each other so that the induced p-n junction involves only the center section 38 of the semiconducting region 30. Light emission is induced by the forward bias of the induced p-n junction 38 by the power source 39.

The d.c. power sources 20 and 21 induce in 30 the p-surface region and n-surface region indicated by plus and minus, respectively. The power sources 20 and 21 are chosen sufficiently small that the currents through the semi-insulator between 34 and 30, and between 35 and 30 are small. These currents are of the space charge limited variety. Avalanche breakdown in the semi-insulator must be avoided by restricting the voltage sources 20 and 21 to sufficiently low values.

The area of the induced p-n junction can be varied by means of the overlap of the projections of 34 and 35 on 30. If the p- and n-regions were induced on the same side, the junction would be restricted to the rim between p- and n-regions, and the cross sectional junction area would be much smaller.

By choosing 30 sufficiently thin, a leakage current path through the bulk semiconductor shunting the induced junction is prevented. Let the semiconducting layer 30 contain a concentration N of impurities inducing n-type semiconduction at zero space charge. Adjacent to the positive inversion layer induced by 34, there is a depletion layer of width somewhat less than, but of the order of $d = \sqrt{2\epsilon_s\epsilon_o B/Nq}$, where B is the forbidden band gap of the semiconductors. If the thickness of the layer 30 is chosen less than the above-mentioned value of $d$, the entire region of the layer 30 which is adjacent to the inversion layer indicated by plus will be depleted of electrons and becomes insulating. Thus the charges entering from the p$^+$ region will flow only along the inversion layer and then through the junction 38.

In the case of GaAs, where B is about 1.3 volts, $d$ becomes about $3 \times 10^3 N^{-1/2}$; i.e., for $N = 10^{14}$ cm$^{-3}$, we obtain $d \approx 3$ microns.

FIG. 5 shows an n-type semiconducting body 40 with contacts 41 and 42 to which a.d.c. voltage is applied from the power source 43. This part of the structure represents a conventional Gunn oscillator. A high field domain is travelling from left to right, and its instantaneous position is indicated by the dotted line 44. Accordingly, most of the applied voltage drop occurs across the domain with the body 40 to the left and right of the domain more or less at the potentials of the contacts 41 and 42, respectively. The semiconducting body 40 of the Gunn oscillator is overlaid at one side by a semi-insulating gallium arsenide layer 45. The layer carries an epitaxial, thin, undoped or lightly doped semiconducting gallium arsenide film 46 with heavily doped p$^+$and N$^+$contact areas 47 and 48. The p$^+$contact area 47 is biased positively against the contact 41 of the Gunn oscillator by the power source 49, while the N$^+$contact is biased negatively against the contact 42 of the Gunn oscillator by the power source 50.

Thus, at the left of the domain 44, a conducting p-layer indicated by plus is induced in 46, while at the right of the domain an n-type conduction layer indicated by minus is induced in 46. The induced p-n junction 51 migrates at the speed of the Gunn domain. It is known that this speed can be adjusted by trapping effects in the semiconducting body 40.

Depending on the magnitudes of the various bias voltages, the induced p-n junction can be forward or else reversed biased. A load resistor 51 can be included in the induced p-n junction circuit.

Since it is obvious that many changes and modifications can be made in the above-described details without departing from the nature and spirit of the invention, it is to be understood that the invention is not limited to said details except as set forth in the appended claims.

What is claimed is:

1. A two terminal semiconducting device comprising a semiconducting layer sandwiched between two insulating layers coated with electrodes, a potential applied between said electrodes to induce a positive mobile charge at one surface of said semiconducting layer and a negative mobile charge at the opposite surface of said semiconducting layer, said applied potential sufficiently large that the bulk charge carriers of said semiconducting layer are depleted along a path extending from said one surface to said other surface, but said applied potential not so large that avalanche breakdown is generated in said insulating layers, means to reverse said applied potential so that said negative induced charge and said positive induced charge exchange positions by travelling through said depletion layer along said path.

2. The device of claim 1 whereby the width $d_s$ of said sandwiched semiconducting layer between said surfaces, its impurity concentration N and the charge $q$ per ionized impurity provide a charge $Nqd_s$ per unit area which is less than said induced mobile negative or positive charge per unit area.

3. A semiconductor device comprising a semiconducting layer having a first and a second surface region, an electrode spaced by an insulating film overlaying each of said surface regions, means to apply a potential between said electrodes, said potential of a sufficient magnitude to induce a depletion region in said semiconducting layer extending from said first to said second surface region, a mobile charge in said first surface region facing an opposite charge on said overlaying spaced electrode, means to change said applied potential so that said mobile charge is shifted from said first to said second surface region.

4. The device of claim 3 whereby said semiconducting layer is silicon, said insulating film is SiO$_2$ and the width of said depletion region extending from said first to said second surface region is approximately 1 micron.

* * * * *